United States Patent [19]
Schenker et al.

[11] 3,890,441
[45] June 17, 1975

[54] PHARMACEUTICAL PREPARATIONS AND METHOD OF USE

[75] Inventors: Karl Schenker, Binningen; Raymond Bernasconi, Oberwil, both of Switzerland

[73] Assignee: Ciba-Geigy Corporation, Ardsley, N.Y.

[22] Filed: May 22, 1974

[21] Appl. No.: 472,332

[30]    Foreign Application Priority Data
    May 25, 1973   Switzerland.......................... 7527/73

[52] U.S. Cl. ............................................... 424/267
[51] Int. Cl............................................ A61k 27/00
[58] Field of Search ..................................... 424/267

[56]         References Cited
             OTHER PUBLICATIONS
Chem. Abst., Vol. 75, 129587z, (1971).

*Primary Examiner*—Stanley J. Friedman
*Attorney, Agent, or Firm*—Joseph G. Kolodny; John J. Maitner; Theodore O. Groeger

[57]          ABSTRACT

1-Methyl-4-(2-benzofuranyl)-piperidine and its acid addition salts possess antidepressive activity. Pharmaceutical preparations are provided comprising 1-methyl-4-(2-benzofuranyl)-piperidine or a pharmaceutically acceptable acid addition salt thereof in association with a pharmaceutical carrier.

9 Claims, No Drawings

NEW PHARMACEUTICAL PREPARATIONS AND METHOD OF USE

The present invention relates to new pharmaceutical preparations having an antidepressive action, as well as to their use for the treatment of mental depression.

It has been found that 1-methyl-4-(2-benzofuranyl)-piperidine of formula I

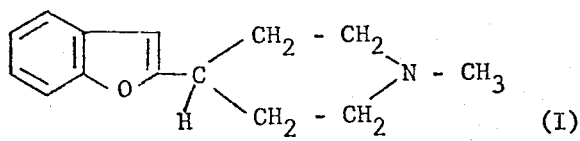

and its pharmaceutically acceptable addition salts with inorganic and organic acids possess valuable pharmacological properties. They inhibit in the rat and in other species of experimental animals, after subcutaneous administration in the dosage range of 10 to 50 mg/kg, mono-amino oxidase, as is shown from the results of the isotopic determination of enzyme activity. At the same time they inhibit, as was verified, likewise in the case of the rat, with subcutaneous administration of 20–50 mg/kg, the absorption of noradrenaline into the heart. Together with a favourable therapeutic index, the above-mentioned properties characterise 1-methyl-4-(2-benzofuranyl)-piperidine and pharmaceutically acceptable acid addition salts thereof as antidepressants. By virtue of these surprising pharmacological properties, the present invention now provides new pharmaceutical preparations preparations useful for the treatment of mental depression. These comprise a therapeutically effective amount of 1-methyl-4-(2-benzofuranyl)-piperidine of the above-given formula I or of a pharmaceutically acceptable addition salt thereof with an inorganic or organic acid, in association with a pharmaceutical carrier. The invention relates also to the method of inducing an antidepressive effect in a warm-blooded animal comprising administering to said animal a small but therapeutically effective amount of 1-methyl-4-(2-benzofuranyl)-piperidine or of a pharmaceutically acceptable addition salt thereof with an inorganic or organic acid.

As pharmaceutical acceptable salts of 1-methyl-4-(2-benzofuranyl)-piperidine, it is possible to use, for example, the hydrobromide, phosphate, methanesulphonate, ethanesulphonate, 2-hydroxyethanesulphonate, acetate, lactate, malonate, succinate, fumarate, maleinate, malate, tartrate, citrate, benzoate, salicylate, phenylacetate, mandelate or embonate and, in particular, the hydrochloride.

1-Methyl-4-(2-benzofuranyl)-piperidine (crude product) and its oxalate, M.P. 214°C, were firstly prepared by H. J. Ziegler et al., Chimie therapeutique, 1971, 159–166m, especially 165, in connection with the preparation and pharmacological testing of optionally substituted 4-(2-benzofuranyl)-pyridines. These exhibited in animal tests neurodepressive properties, as was concluded from the reduction of the locomotor activity and the potentiation of barbiturate anaesthesia in the mouse after intraperitoneal administration; however, it was not possible in clinical tests with 4-(2-benzofuranyl)-pyridine to provide evidence of the expected anxiolytic action. The said publication contains no information at all concerning pharmacological properties of 1-methyl-4-(2-benzofuranyl)-piperidine and its oxalate.

Pharmaceutically acceptable acid addition salts of 1-methyl-4-(2-benzofuranyl)-piperidine of formula I can be prepared in a manner known per se. For example, the salt desired as salt component, or a solution thereof in an organic solvent such as ethyl acetate or diethyl ether, is added to a solution of 1-methyl-4-(2-benzofuranyl)-piperidine in an organic solvent, such as, e.g. ethyl acetate, acetone, methyl ethyl ketone, ethanol or isopropanol, and, if necessary after cooling or concentration by evaporation or after addition of a solvent having a poorer dissolving capacity for salts, such as, e.g. diethyl ether, the precipitated salt is filtered off.

The pharmaceutical preparations according to the invention can be preparations for oral, rectal or parenteral administration to warm-blooded animals. The dosage amount of 1-methyl-4-(2-benzofuranyl)-piperidine and of pharmaceutically acceptable salts thereof depends on the mode of administration, on the species of warm-blooded animal, on the age and on the individual condition. The daily doses of the free base or of the pharmaceutically acceptable acid addition salts thereof very between 0.15 and 10 mg/kg for warm-blooded animals. Pharmaceutical preparations according to the invention, in dosage units such as dragees, tablets, suppositories or ampoules, preferably contain 5–100 mg of 1-methyl-4-(2-benzofuranyl)-piperidine or, preferably, of a pharmaceutically acceptable acid addition salt of this base.

Dosage units according to the invention for oral administration contain as active substance preferably between 5 and 90 percent of 1-methyl-4-(2-benzofuranyl)-piperidine or of a pharmaceutically acceptable acid addition salt thereof. The said dosage units are prepared by combination of the active substance with, for example, solid pulverulent carriers such as lactose, saccharose, sorbitol or mannitol; starches such as potato starch, maize starch or amylopectin, also laminaria powder or citrus pulp powder, cellulose derivatives or gelatine, optionally with the addition of lubricants such as magnesium or calcium stearate or polyethylene glycols, to form tablets or dragee cores. The dragee cores are coated, for example, with concentrated sugar solution, which can also contain, for example, gum arabic, talcum and/or titanium dioxide, or with a lacquer dissolved in readily volatile organic solvents or solvent mixtures. Colouring agents may be added to these coatings, e.g. for identification of the various doses of active substance.

Further suitable oral dosage units are hard gelatine capsules, as well as soft closed capsules made from gelatine and a softener such as glycerin. The hard gelatine capsules contain the active substance preferably as a granulate, e.g. in admixture with fillers such as maize starch, and/or lubricants such as talcum or magnesium stearate, and optionally stabilisers such as sodium metabisulphite ($Na_2S_2O_5$) or ascorbic acid. In soft capsules, the active substance is preferably dissolved or suspended in suitable liquids, such as liquid polyethylene glycols, where likewise stabilisers may be added.

Suitable dosage units according to the invention for rectal administration are, for example, suppositories consisting of a combination of an active substance with a suppository foundation substance. Applicable suppository foundation substances are, for example, natural or synthetic triglycerides, paraffin hydrocarbons, polyethylene glycols or higher alkanols. Also suitable are gelatine rectal capsules consisting of a combination of the active substance with a foundation substance. Suitable foundation substances are, for example, liquid triglycerides, polyethylene glycols or paraffin hydrocarbons.

Ampoules for parenteral administration, particularly intramuscular administration, preferably contain a water-soluble salt of 1-methyl-4-(2-benzofuranyl)-piperidine in a concentration preferably of 0.5 – 5 percent, optionally together with suitable stabilising agents and buffer substances, in aqueous solution.

The following Example 1 illustrates an advantageous reaction sequence for preparation of 1-methyl-4-(2-benzofuranyl)-piperidine, hitherto described only as oxalate, as well as for preparation of the hydrochloride of this base. Further examples describe the preparation of some typical dosage units; however, these in no way serve to limit the scope of the invention.

The temperature values in Example 1 are expressed in degrees Centigrade

EXAMPLE 1 a. 146.4 g of salicylaldehyde, 196.8 g of 4-(chloromethyl)-pyridine-hydrochloride, 750 g of potassium carbonate and 2 g of potassium iodide are heated in 3 litres of dimethylformamide, with stirring, for 15 hours at 80°–90°. The solution is then filtered off under suction, and the filter residue is subsequently washed with 1 litre of chloroform. The combined filtrates are concentrated in vacuo, and the residue after evaporation is dissolved in 1 litre of chloroform. The organic phase is washed first with 1 litre of 2N sodium hydroxide and then with 1 litre of water; it is dried by means of sodium sulphate, filtered off under suction and concentrated by evaporation. The crude o-[(4-pyridyl)-methoxy]-benzaldehyde remaining is further processed without purification.

b. 290 g of o-[(4-pyridyl)-methoxy]-benzaldehyde is heated for 30 minutes at 300° under nitrogen. After cooling, the residue is dissolved in a small amount of methylene chloride, and the solution is chromatographed through 3 kg of aluminum oxide (activity II, neutral). The first fraction, eluted with 4 litres of methylene chloride, is 4-(2-benzofuranyl)-pyridine. The compound melts at 132°–133° after recrystallisation from ethanol.

c. 81.0 g of 4-(2-benzofuranyl)-pyridine is dissolved in 1.5 litres of ethanol and hydrogenated in the presence of 10.0 g of palladium charcoal (5 percent) at a temperature of between 70° and 80° and an initial pressure of 80 bars. After 15 hours, 25.8 litres of hydrogen have been absorbed. Hydrogenation is terminated, the catalyst is filtered off and the filtrate is concentrated in vacuo. The residue is fractionally distilled in high vacuum. The fraction distilling at 122° to 129° and 0.10 Torr is 4-(2-benzofuranyl)-piperidine. The hydrochloride prepared therefrom with a solution of hydrogen chloride in ethyl acetate melts at 228°–230° after recrystalliation from acetone.

d. 10 g of 4-(2-benzofuranyl)-piperidine is dissolved in 50 ml of formic acid. To this solution is added dropwise, with stirring, 6 ml of 40 percent aqueous formaldehyde solution. The reaction mixture is heated for 5 hours at 95°–100°, and subsequently stirred for 15 hours at room temperature. The reaction solution is then rendered acid by the addition of 10 ml of conc. hydrochloric acid, and thereupon concentrated in vacuo. The residue is dissolved in 100 ml of water; the non-basic substances are extracted with toluene, and the aqueous phase is adjusted to pH = 14 by addition of 10 percent sodium hydroxide solution, and extracted twice with 300 ml of chloroform each time. The chloroform solutions are combined, dried by means of sodium sulphate, filtered, and concentrated by evaporation. The evaporation residue is chromatographed on 500 g of aluminium oxide, activity II, neutral. The first fraction, eluted with 500 ml of chloroform, is not homogeneous according to thin-layer analysis. The second fraction, eluted with 500 ml of chloroform, is pure 1-methyl-4-(2-benzofuranyl)-piperidine. The compound melts at 72°–73° after recrystallisation from diisopropyl ether.

The 1-methyl-4-(2-benzofuranyl)-piperidine-hydrochloride prepared from the base with a solution of hydrogen chloride in ethyl acetate is recrystallised from methyl acetate and then melts at 272°–273°.

EXAMPLE 2

250 g of 1-methyl-4-(2-benzofuranyl)-piperidine-hydrochloride is mixed with 175.80 g of lactose and 169.70 g of potato starch; the mixture is moistened with an alcoholic solution of 10 g of stearic acid and granulated through a sieve. The granulate is dried and 160 g of potato starch, 200 g of talcum, 2.50 g of magnesium stearate and 32 g of colloidal silicon dioxide are mixed in, and the mixture is then pressed to obtain 10,000 tablets each weighing 100 mg and each containing 25 mg of active substance. If desired, the tablets may be provided with grooves to give a more precise adjustment of the dosage amount.

EXAMPLE 3

A granulate is prepared from 250 g of 1-methyl-4-(2-benzofuranyl)-piperidine-hydrochloride, 175.90 g of lactose and the alcoholic solution of 10 of stearic acid; after drying, the granulate is mixed with 56.60 g of colloidal silicon dioxide, 165 g of talcum, 20 g of potato starch and 2.50 g of magnesium stearate, and the mixture is subsequently pressed to give 10,000 dragee cores. These are then coated with a concentrated syrup made from 502.28 g of crystallised saccharose, 6 g of shellac, 10 g of gum arabic, 0.22 g of colouring agent and 1.5 g of titanium dioxide, and afterwards dried. The resulting dragees each weigh 120 mg and each contain 25 mg of active substance.

EXAMPLE 4

To prepare 1000 capsules each containing 10 mg of active substance, 10.0 g of 1-methyl-4-(2-benzofuranyl)-piperidine-hydrochloride is mixed with 248 g of lactose; the mixture is evenly moistened with an aqueous solution of 2 g of gelatine, and then granulated through a suitable sieve (e.g. sieve III according to Ph. Helv. V). The granulate is mixed with 10.0 g of dried maize starch and 15.0 g of talcum, and the whole is uniformly filled into 1,000 hard gelatine capsules, size 1.

EXAMPLE 5

A suppository mixture is prepared from 2.5 g of 1-methyl-4-(2-benzofuranyl)-piperidine-hydrochloride and 167.5 g of adeps solidus, and from this mixture are then poured 100 suppositories each containing 25 mg of active substance.

EXAMPLE 6

A solution of 10.0 g of 1-methyl-4-(2-benzofuranyl)-piperidine-hydrochloride in one litre of water is filled into 1,000 ampoules and subsequently sterilised. An ampoule contains a 1 percent solution of 10 mg of active substance.

What we claim is:

1. A pharmaceutical preparation in the form of a dragee, tablet, suppository or ampoule useful for the treatment of mental depression, comprising a therapeutically effective amount of 1-methyl-4-(2-benzofuranyl)-piperidine of the formula

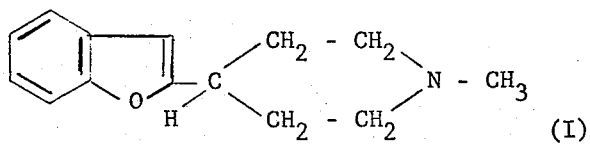

or of a pharmaceutically acceptable addition salt thereof with an inorganic or organic acid, in association with a pharmaceutical carrier.

2. A pharmaceutical preparation according to claim 1 in dosage units for oral administration.

3. A pharmaceutical preparation according to claim 1 in dosage units for rectal administration.

4. A pharmaceutical preparation according to claim 1 in dosage units for parenteral administration.

5. A pharmaceutical preparation according to claim 1 comprising a therapeutically effective amount of 1-methyl-4-(2-benzofuranyl)-piperidine-hydrochloride, in association with a pharmaceutical carrier.

6. The method of inducing a mono-amino oxidose effect in a warm-blooded animal comprising administering to said animal a small but therapeutically effective amount of 1-methyl-4-(2-benzofuranyl)-piperidine or of a pharmaceutically acceptable addition salt thereof with an inorganic or organic acid.

7. The method according to claim 6 which comprises administering a small but therapeutically effective amount of 1-methyl-4-(2-benzofuranyl)-piperidine or of a pharmaceutically acceptable acid addition salt thereof with an inorganic or organic acid, in association with a pharmaceutical carrier.

8. The method according to claim 6 which comprises administering a small but therapeutically effective amount of 1-methyl-4-(2-benzofuranyl)-piperidine-hydrochloride.

9. The method according to claim 6 which comprises administering a small but therapeutically effective amount of 1-methyl-4-(2-benzofuranyl)-piperidine-hydrochloride, in association with a pharmaceutical carrier.

* * * * *